US009288536B2

(12) United States Patent
Feig et al.

(10) Patent No.: US 9,288,536 B2
(45) Date of Patent: Mar. 15, 2016

(54) METHOD AND APPARATUS FOR USING VIEWERSHIP ACTIVITY DATA TO CUSTOMIZE A USER INTERFACE

(71) Applicant: Concurrent Computer Corporation, Duluth, GA (US)

(72) Inventors: Aaron Feig, Broadview Heights, OH (US); Robert E. Chism, Duluth, GA (US)

(73) Assignee: Concurrent Computer Corporation, Duluth, GA (US)

( * ) Notice: Subject to any disclaimer, the term of this patent is extended or adjusted under 35 U.S.C. 154(b) by 323 days.

(21) Appl. No.: 13/927,463

(22) Filed: Jun. 26, 2013

(65) Prior Publication Data
US 2015/0007204 A1   Jan. 1, 2015

(51) Int. Cl.
*H04L 29/06* (2006.01)
*H04N 21/442* (2011.01)
*H04N 21/81* (2011.01)
*H04N 21/258* (2011.01)
*G06Q 30/02* (2012.01)

(52) U.S. Cl.
CPC ..... *H04N 21/44218* (2013.01); *G06Q 30/0254* (2013.01); *H04N 21/25883* (2013.01); *H04N 21/25891* (2013.01); *H04N 21/812* (2013.01)

(58) Field of Classification Search
USPC .......................................... 725/10
See application file for complete search history.

(56) References Cited

U.S. PATENT DOCUMENTS

| | | | | |
|---|---|---|---|---|
| 7,020,690 | B1 * | 3/2006 | Haitsuka | H04L 67/24 709/217 |
| 2006/0184800 | A1 | 8/2006 | Rosenberg | |
| 2007/0250855 | A1 | 10/2007 | Quinn-Jacobs et al. | |
| 2008/0117202 | A1 * | 5/2008 | Martinez | G06F 17/30035 345/418 |

* cited by examiner

*Primary Examiner* — Jefferey Harold
*Assistant Examiner* — Sihar Karwan
(74) *Attorney, Agent, or Firm* — Phillip H. Burrus, IV

(57) ABSTRACT

A method (300) and system (100,200) for customizing a user interface (122) on a display or consumption device (121) is provided. In one embodiment, the method includes delivering, with a control circuit (210), an advertisement (114) to a plurality of client devices (106,107,108). A channel collector device 113 can then capture viewership activity data (116, 117,118) occurring during playout of the advertisement. The method then modifies a presentation characteristic of the user interface by presenting a playback (501) comprising both the advertisement and at least some of the viewership activity data in synchrony.

20 Claims, 6 Drawing Sheets

METHOD AND APPARATUS FOR USING VIEWERSHIP ACTIVITY DATA TO CUSTOMIZE A USER INTERFACE

BACKGROUND

1. Technical Field

This disclosure relates generally to user interface systems, and more particularly to user interface customization systems.

2. Background Art

The requirement for a viewer to view advertisements while watching content, such as a movie or television program, is ubiquitous. Advertisers help subsidize content, especially that delivered to private client devices, by purchasing advertising that is to be presented with the content. Users understand that advertisements are included with such content. Users further understand the implicit agreement that purveyors of goods and services use advertisements to present their wares so as to reduce the cost of receiving the content for private viewing.

Prior art advertising systems with video content have generally been limited. With prior art systems an advertiser must select a show in which to purchase advertising space. The advertiser's advertisement is then broadcast to all viewers of that show. While this can be an effective method of advertising, it precludes the advertiser from effectively understanding how an audience received the advertisement. Moreover, while a viewer may consider a particular advertisement to be "good," they may have loved or hated certain portions of the advertisement. However, the advertiser has no way of knowing this data. This hit-or-miss, broadcast method of advertising is frequently a less than efficient means of achieving the advertiser's business goals.

It would be advantageous to have a more effective advertising analysis system.

Figure 1:
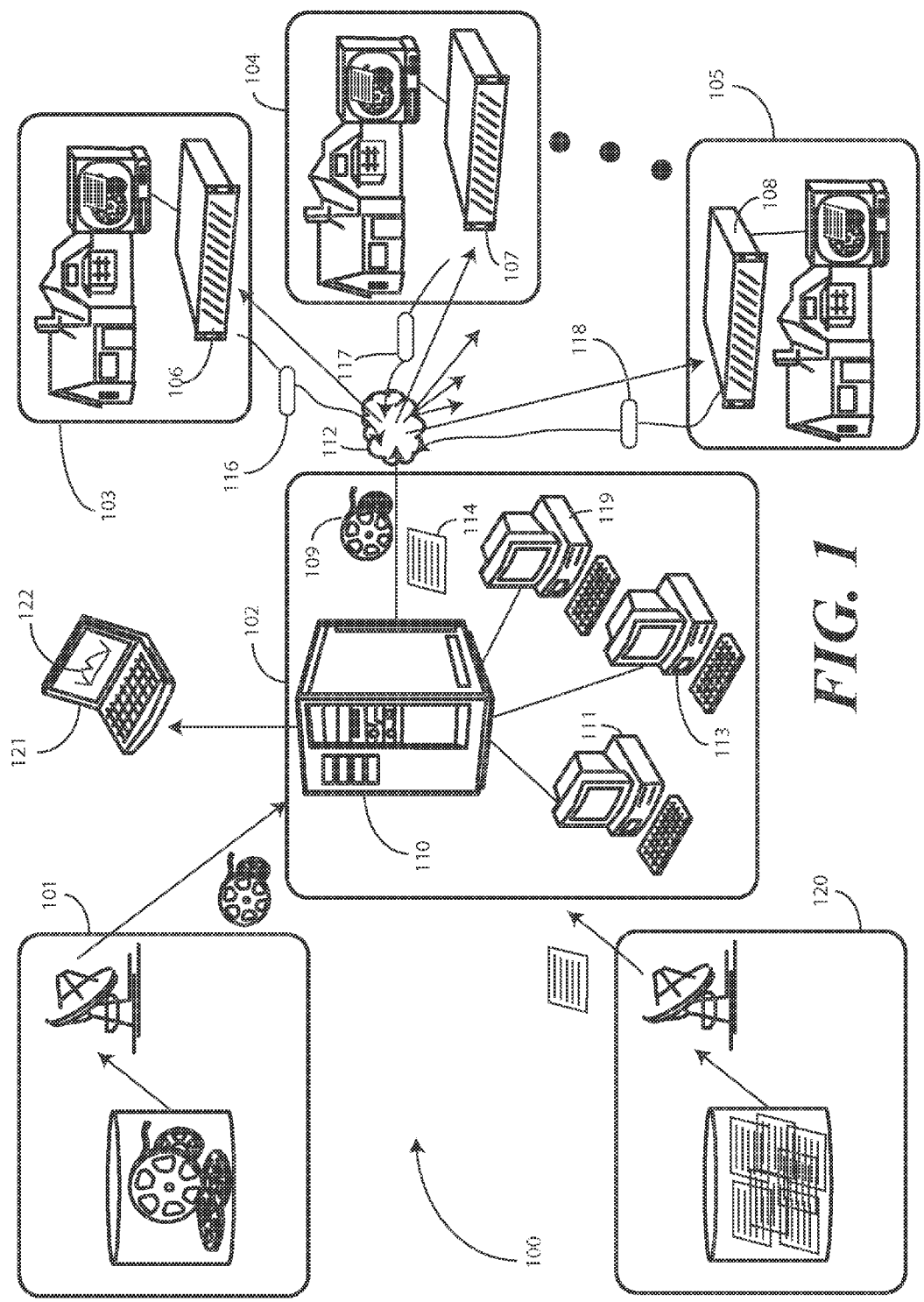
FIG. 1 illustrates an explanatory system in accordance with one or more embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to providing a user interface as described herein. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of user interface configuration, presentation, alteration, modification, and delivery as described herein. The non-processor circuits may include, but are not limited to, a data receiver, a data transmitter, signal drivers, clock circuits, power source circuits, memory devices, client devices, data capture devices, control circuits, and user input devices. As such, these functions may be interpreted as steps of a method to perform data presentation, in the form of a user interface, on a display device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a method for customizing a user interface on a display device. In one embodiment, a control circuit delivers an advertisement to one or more client devices. The advertisement can be delivered in conjunction with content, such as a movie or television program, or can be delivered independent of content to a client device. As the advertisement is consumed by a user via the client device, in one embodiment a channel collector operable with the control circuit can capture viewership activity data occurring during playout of the advertisement. In one embodiment the viewership activity data and the advertisement can also be stored in a memory operable with the control circuit.

To provide advertisers and other entities interested in how users react to the advertisement, in one embodiment the method provides a user interface that presents both the advertisement and at least some of the viewership activity data on the user interface in a temporally synchronized fashion. Accordingly, as the advertiser or other entity views the advertisement being played in real time, a graphical representation of at least some of the viewership activity data shows how users reacted to the advertisement on a second by second basks. Accordingly, in one embodiment, the control circuit modifies a presentation characteristic of the user interface by presenting a playback comprising both the advertisement and at least some of the viewership activity data in synchrony. In one embodiment, the viewership activity data can be filtered. For example, in one embodiment the viewership activity data can be filtered by demographic data. In other embodiments, the viewership activity data can be filtered by residence data, geographic data, or economic data. Other filters will be obvious to those of ordinary skill in the art having the benefit of this disclosure.

Advantageously, embodiments of the disclosure allow a user to analyze second-by-second viewership activity and trends occurring across any demographic, economic, residence, and/or geographic attribute while simultaneously watching the corresponding advertisement. The user will therefore be able to associate viewership habits with the exact time duration during the advertisement. Embodiments of the disclosure provide advertisers, content providers, marketing teams, and so forth with a user interface device and tool to accurately analyze the success or failure of their advertisement against defined campaign criteria. Analytics provided in the user interface can be used to optimize both future advertisements and associated campaigns, as well as for modifying existing advertisements to increase the viewership trends. Applications well suited for embodiments of the disclosure include analyzing second-by-second linear viewership data and second-by-second consumer.

Turning now to FIG. 1, illustrated therein is an explanatory system 100 in accordance with one or more embodiments of the disclosure. A server complex 102 is in communication with one or more client devices 106,107,108. The illustrative server complex 102 of FIG. 1 includes a central server device 110, a warehouse server device 111, and a channel collector device 113.

The server complex 102 is configured to deliver one or more advertisements 114 to the client devices 106,107,108. In one embodiment, the server complex 102 delivers the advertisements 114 in conjunction with content 109 provided by a content service provider 101. For example, the content 109 may be a television program that is delivered to the client devices 106,107,108 with the advertisements 114, which may be integrated into the content 109 or sent separately from the content 109. In one embodiment, the advertisements 114 are delivered from an advertiser 120 or other source.

In one embodiment, the system 100 is configured for delivering the content 109 and/or advertisements 114 to one or more users 103,104,105 via the client devices 106,107,108. In this illustrative embodiment, each of the users 103,104,105 has a corresponding client device 106,107,108 configured to receive the content 109 and/or advertisements 114. Examples of client devices 106,107,108 occurring in various environments include a television, "smart" television, set-top-box, personal computer, laptop, smartphone, tablet computer, personal digital assistant, handheld computer, cellular telephone, or the like. Combinations can be used as well. Some client devices can be set-top boxes, while other client devices are portable electronic devices and so forth.

In one illustrative embodiment, the server complex 102 is capable of interaction with the client devices 106,107,108. For example, the server complex 102 may be configured to determine what advertisement 114 each client device 106, 107,108 is receiving. Additionally, the server complex 102 can be configured to cause a channel collector device 113, which may be a server or other network communication device having one or more control circuits, to capture viewership activity data 116,117,118 occurring during playout of the advertisements 114. The viewership activity data 116, 117,118 can include demographic data corresponding to the one or more users 103,104,105, economic data corresponding to the one or more users 103,104,105, geographic data corresponding to the one or more users 103,104,105, residence data corresponding to the one or more users 103,104,105, or combinations thereof. Other types of viewership activity data 116,117,118 will be obvious to those of ordinary skill in the art having the benefit of this disclosure.

In one or more embodiments, the server complex 102 is configured to correlate the viewership activity data 116,117, 118 with the specific user of the one or more users 103,104, 105 from which it came. For example, the server complex 102 can be configured to determine unique device identifier for each of the client devices 106,107,108 so that the client devices 106,107,108 can be identified on a singular basis. Examples of device identifiers include a MAC address or IP address in a computer environment, a mobile telephone number in a mobile environment, a serial number or other unique identifier in a set-top box environment, and so forth.

In one embodiment, the server complex 102 employs a message queuing process to obtain the viewership activity data 116, 117,118. One example of a message queuing process that would be suitable for use with embodiments of the disclosure is the Fuse Message Broker manufactured by RedHat, Inc. The server can use the message queuing process to obtain and map POST requests received from the client devices 106,107,108. POST requesting is a method that allows the server complex 102 to accept data, e.g., the viewership activity data 116,117,118, enclosed in the request message's body for storage. For example, the server complex 102 in one embodiment can upload files comprising the viewership activity data 116,117,118 in the form of files, completed user interface forms, and/or completed web forms. In one embodiment, the server complex 102 sends a representation of a new data entity to one or more of the client devices 106,107,108. Users 103,104,105 can then interact with the data entity using their client devices 106,107,108, thereby incorporating viewership activity data 116,117,118 into the data entities. These data entities can then be retrieved by the server complex 102 and stored in a warehouse server device 111. In one embodiment, when a POST request is received, the sever complex 102 can be configured to convert the data into a homogenized format suitable for subsequent processing. In one embodiment, the incoming messages can be optionally logged for audit purposes.

In one or more embodiments, the server complex 102 can sequence the viewership activity data 116,117,118 by setting the millisecond value of the event timestamp. This function can be used for both load balancing, and for presenting at least some of the viewership activity data 116,117,118 in synchrony with the advertisement, as will be discussed in more detail below. Where multiple data events are received with the same date and time, a sequence number can be assigned to each record in the millisecond part of the timestamp to preserve proper order of the data.

As noted above, in one embodiment, the viewership activity data 116,117,118 can be stored in a warehouse server device 111. In one embodiment, the warehouse server device 111 maintains access via synonyms into a channel collector device 113 schemas for mapping metadata of the viewership activity data 116,117,118 to ensure consistency. Additionally, the warehouse server device 11 can consume and store channel data from the collector message queue of the channel collector device 113.

Once the viewership activity data 116,117,118 is captured, the server complex 102 can deliver a user interface 122 to a consumption device 121, shown here as a computer. In one embodiment, the user interface 122 comprises both the advertisement 114 and at least some of the viewership activity data 116,117,118. In one embodiment, the advertisement 114 and at least some of the viewership activity data 116,117,118 are presented in synchrony so that a user of the system can watch the advertisement 114 being played and determine when, where, and how changes in the viewership activity data 116, 117,118 occurred during playout of the advertisement 114 on the client devices 106,107,108.

Where content 109 is delivered with the advertisement, one or more content providers 101 may optionally generate the content 109 and deliver it to the server complex 102 for distribution to the client devices 106,107,108. The same is true with advertisements 114. One or more advertisers 120 may optionally generate the advertisements 114 and deliver them to the server complex 102 for distribution to the client devices 106,107,108. Where either occurs, the content 109 and/or advertisements 114 can be delivered in various formats and protocols, depending upon the type of system employed. For example, the server complex 102 may receive RF signals by satellite, ATM data from ATM networks, local feeds, and other information via terrestrial link. The content providers 101 and/or advertisers 120 may also provide the content 109 and/or advertisements 114 by traditional means, such as by tape, DVD, or alternatively may transmit digital files across a network.

A content receiver (not shown) operable with the server complex 102 can receive the content 109. In one embodiment, the central server device 110 then stores the content 109 in a content database. In another embodiment, the central server device 110 simply passes the content through for distribution to the users 103,104,105 through its network.

In one embodiment, the central server device 110 is configured to insert the advertisements 114 into the content 109. Where necessary, the server complex 102 can optionally process and/or reformat the content 109 as necessary for delivery to the client devices 106,107,108. For example, content 109 may be received in digitally compressed format, demultiplexed by a demultiplexer, and stored in any convenient format or formats, such as MPEG-1, MPEG-2, MPEG-3, or MPEG-4. It will be clear to those of ordinary skill in the art having the benefit of this disclosure that other formats can be used as well. Such formats are known in the art and will not be discussed in further detail here in the interest of brevity.

An advertising database 119 can be operable with the central server device 110 to store one or more advertisements 114 stored. In one embodiment, the advertisements comprise video advertisements. One example of an advertisement 114 is a "banner ad" that can be overlayed across content offerings. These banner ads appear on video content such as web pages, movies, videos, and television programs. Another example of an advertisement 114 is an interstitial advertisement that is inserted between portions of the content 109, such as a television commercial. Another example of an advertisement 114 is a parallel advertisement that is presented to the side of, above, or below, the content 109 while the content is being presented. These examples of advertisements are illustrative only. The advertisements 114 can be static or dynamic.

The advertisements 114 are configured for delivery to client devices 106,107,108 belonging to members of an audience, which in the illustrative embodiment of FIG. 1 is shown as users 103,104,105. The advertisements 114 can include, in addition to the advertising content itself, content descriptive data regarding advertised products and services. This advertising descriptive data may be configured as metadata. The advertisements 114 can be targeted, such that each user received advertising content correlated to their preferences, profiles, usage data, demographics, etc. In other embodiment, the advertisements 114 can be general, where, for example, one advertisement 114 is delivered to all client devices 106, 107,108.

In one embodiment, a user 103 selects a content offering to watch by way of its client device 106. The content offering can be sent across an interactive network 112 by way of network equipment that provides the managing, processing, and modulation, as appropriate, for the delivery of the content offering across the interactive network 112 to the client device 106.

The interactive network 112 may be any type of network capable of transferring data electronically, such as, but not limited to, cable networks, the Internet, wireless networks, Telco networks, or satellite networks. For ease of explanation, an illustrative embodiment will employ a cable network. However, it will be clear to those of ordinary skill in the art having the benefit of this disclosure that embodiments are not so limited. Other networks can be used as well.

Figure 2:
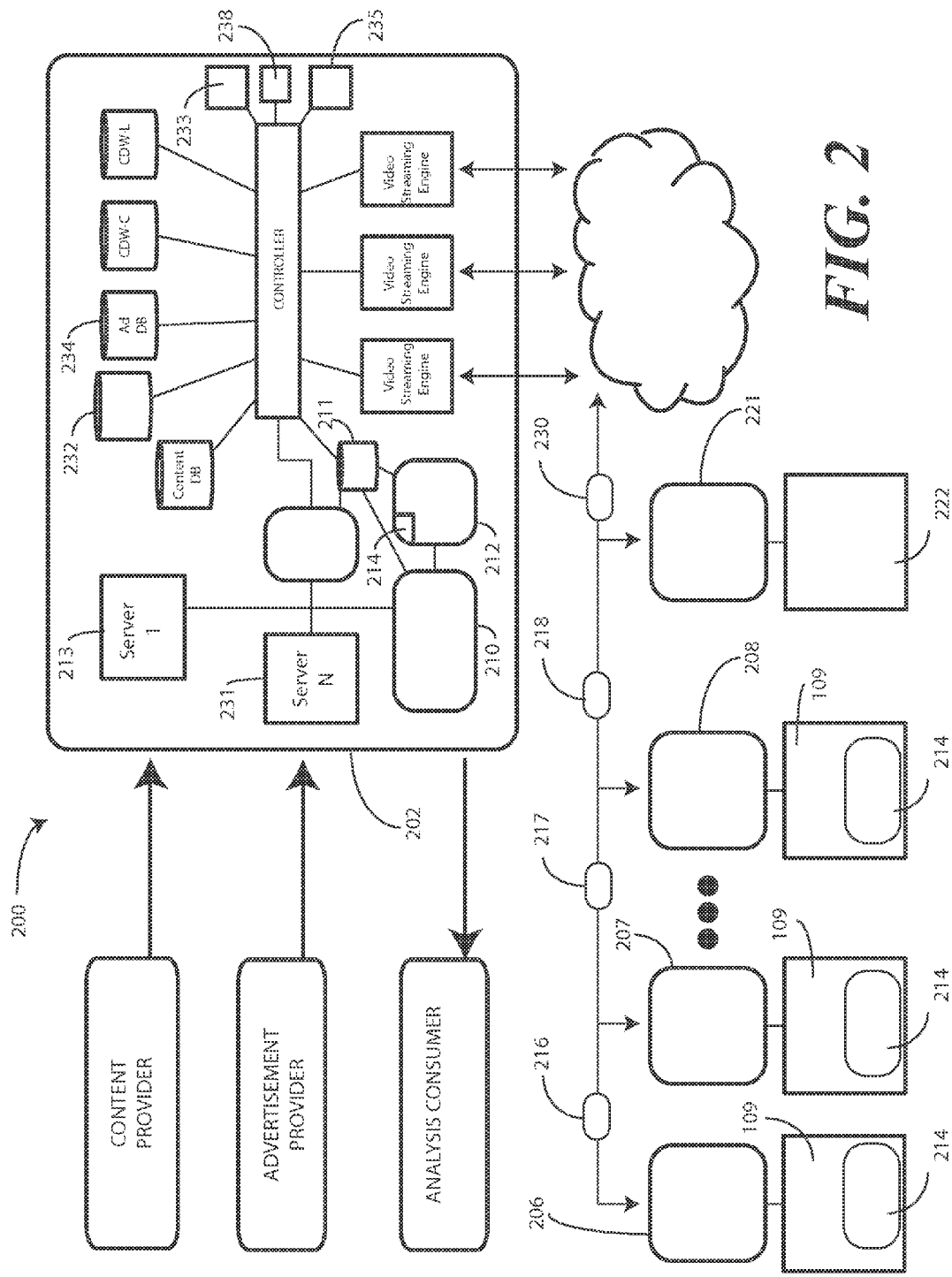
FIG. 2 illustrates an explanatory system in accordance with one or more embodiments.

Turning now to FIG. 2, illustrated therein is another system 200 to customize a user interface for a display device in accordance with one or more embodiments of the disclosure. A delivery device 202 is in communication with one or more client devices 206,207,208. In one embodiment, the delivery device 202 is also in communication with a consumption device 221.

In one embodiment, the delivery device 202 includes a control unit 210 or other processing device operable with one or more memory devices 212. The one or more memory devices 212 can include a database management system 211. The database management system 211 can function as a server or storage device and has appropriate software.

In one embodiment, the delivery device 202 can retrieve an advertisement 214 from the one or more memory devices 212. The delivery device can then deliver the advertisement 214 to the client devices 206,207,208. A data capture device 213 can then capture viewer behavior data 216,217,218 that occurs while the advertisement 213 is in playback on the client devices 206,207,208. The delivery device 202 can then synchronize the advertisement 214 and the viewer behavior data 216,217,218 in the one or more memory devices 212. The delivery device 202 can then deliver a user interface 222 to the consumption device 221. In one embodiment, the user interface 222 is to playback the advertisement 214 and at least some of the viewer behavior data 216,217,218 in synchrony.

In one embodiment, the delivery device 202 can receive a filter 230. For example, in one embodiment the user interface 222 includes filter selection controls. In another embodiment, the delivery device 202 may modify the user interface 222 so as to present the filter selection controls. It may be that a user of the system 200 wants to focus only on specific portions of the viewer behavior data 216,217,218. For example, they may want to focus on viewer behavior data 216,217,218 corresponding to a particular viewer demographic. Accordingly, they may actuate the filter selection controls to send a filter limiting the viewer behavior data 216,217,218 only to that corresponding to a particular demographic to the delivery device 202. The delivery device can alter at least some of the viewer behavior data 216,217,218 in accordance with the filter 230.

In another embodiment, the control circuit 210 can deliver an advertisement 214 to the client devices 206,207,208. A channel collector device 238, operable with the control circuit 210, can capture viewership activity data (116,117,118) occurring during playout of the commercial 214 on the client devices 206,207,208. The control circuit 210 can store the viewership activity data (116,117,118) in the one or more memory devices 212. The control circuit 210 can then modify a presentation characteristic of the user interface 222 by presenting a playback comprising both the advertisement 214 and at least some of the viewership activity data (116,117,118) in synchrony.

The control circuit 210 can interact with one or more servers 231 and/or one or more databases 232 to store the viewership activity data (116,117,118) and/or the viewer behavior data 216,217,218. In one embodiment the databases 232 can take one of two main forms: relational databases and non-relational databases. Relation databases have enforceable constraints between tables, whereas non-relational databases do not have enforceable constraints between tables. Non-relational databases can be better suited for macro-scale data storage, such as data comprising terabytes to petabytes or more. In some applications, relational databases can be limited in ability to join data across the enforced constraints. One example of a non-relational databases is the Map-Reduce.sup™ database framework created by Google, Inc. Examples of a relational databases are those manufactured my Oracle, Inc., including their MySql.sup™ database software, and Microsoft, Inc. in their Access.sup™ database product.

In one embodiment, an advertising selector 233 is operable with the control circuit 210. The advertising selector 233, where used, can be configured to select one or more advertisements 214 from an advertisement database 234 for delivery to user devices of members of an audience. The selection can be based upon a variety of factors, including demographic studies with reference to particular content 209, advertiser requests for advertising placement during the content 209, viewership of the content 209, and so forth.

The collection and capturing of the viewership activity data (116,117,118) and/or the viewer behavior data 216,217,218 is possible due to the delivery device's ability to interact with the client devices 206,207,208 in one embodiment. Said differently, in one embodiment, the delivery device 202 is able to query the client devices 206,207,208 to extract the viewership activity data (116,117,118) and/or the viewer behavior data 216,217,218. Accordingly, user interface presentation data can be compiled from POST responses that are transmitted from the client devices 106,107,108 in the form of the viewership activity data (116,117,118) and/or the viewer behavior data 216,217,218 to the delivery device 202 and/or control circuit 210 in response to queries. For instance, where a user (103,105) has been presented the advertisement 214, a corresponding client device (106,108) can transmit a positive presentation response in the form of the viewership activity data (116,117,118) and/or the viewer behavior data 216,217,218 to the delivery device 202.

A database-mining engine 235 can be operable with the delivery device 202 and/or the control circuit 210 in some embodiments. The a database-mining engine, which in one embodiment is operable with an audience demographic database or, additionally, the databases 232, can be configured to act to correlate and process the viewership activity data (116, 117,118) and/or the viewer behavior data 216,217,218.

In one embodiment, the delivery device 202 can be configured to determine specific identities of the client devices 206,208 delivering the viewership activity data (116,117, 118) and/or the viewer behavior data 216,217,218. The control circuit 210 can be configured to perform the identification by detecting a device identifier, which is included in one embodiment in each user device 206,207,208. The device identifiers can be delivered in the up stream presentation response communication.

Figure 3:
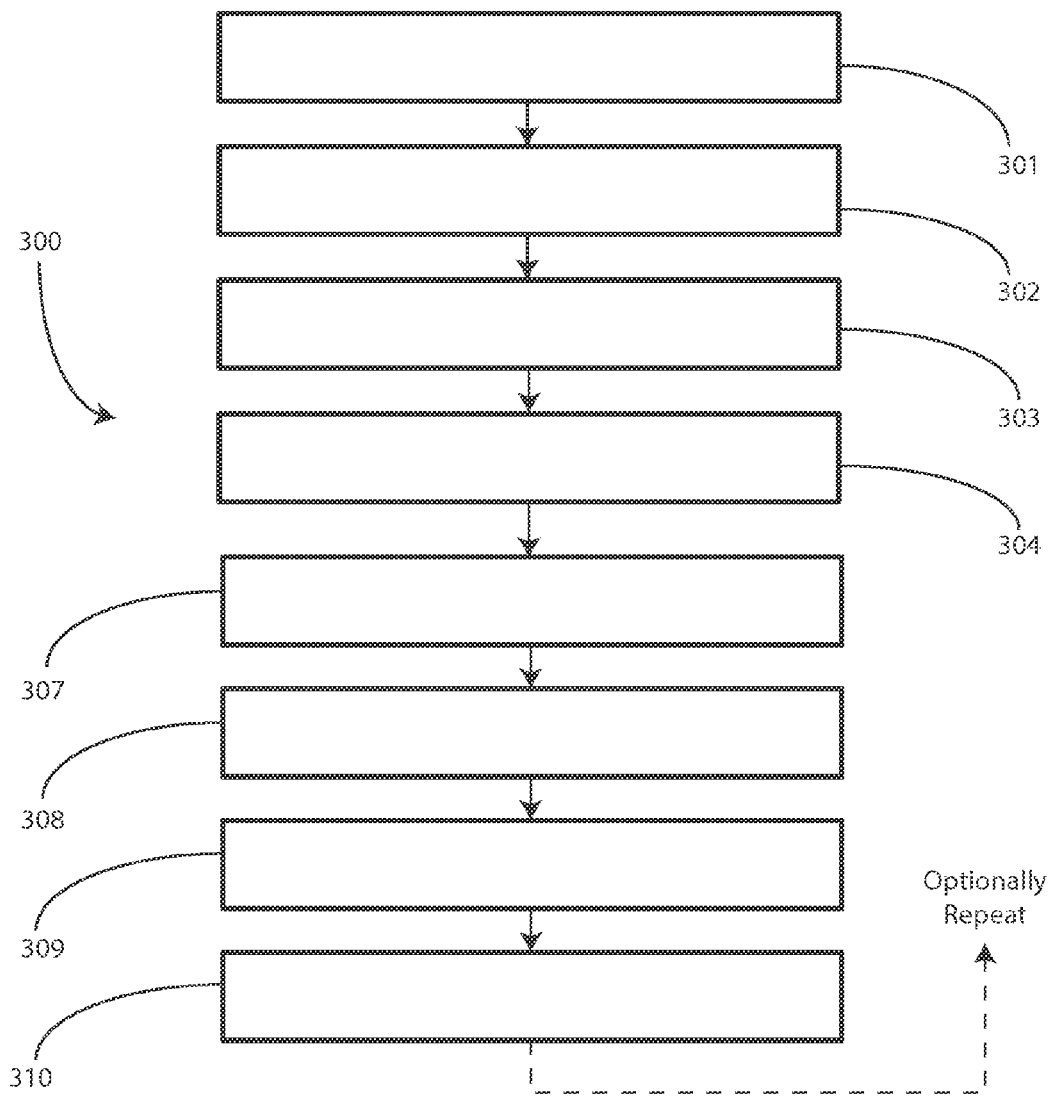
FIG. 3 illustrates an explanatory method in accordance with one or more embodiments.

Turning now to FIG. 3, illustrated therein is one method 300 for customizing a user interface on a display device in accordance with one or more embodiments of the disclosure. At step 301, the method 300 includes delivering an advertisement to a plurality of client devices. In one embodiment, step 301 can be performed by a control circuit.

At step 302, the method 300 includes capturing viewership activity data occurring during the playout of the advertisement. In one embodiment, step 302 can be performed by a channel collector.

At step 303, the method 300 can optionally include storing the advertisement in a memory. Where step 301 is performed by a control circuit, the memory of step 303 can be operable with the control circuit.

At step 304, the method 300 can include modifying a presentation characteristic of a user interface by presenting a playback comprising both the advertisement and at least some of the viewership activity data in synchrony. In one embodiment, step 304 can be performed by a control circuit. In one embodiment, the synchrony of step 304 can occur on a second-by-second basis. In one embodiment, step 304 includes presenting the viewership activity data in a linear presentation window.

In one embodiment, the viewership activity data of step 304 can comprise demographic data. In one embodiment, the viewership activity data of step 304 can comprise economic data. In one embodiment, the viewership activity data of step 304 can comprise residence data. In one embodiment, the viewership activity data of step 304 can comprise residence data. In one embodiment, the viewership activity data of step 304 can comprise geographic data. Of course, combinations of these data can be used as well. Other portions of viewership activity data will be obvious to those of ordinary skill in the art having the benefit of this disclosure.

At optional step 305, the method 300 can include receiving a user input identifying the viewership activity data employed at step 304. In one embodiment, step 304 is performed by a control circuit.

At optional step 306, the method 300 can include receiving another user input identifying at least some other of the viewership data. In one embodiment, step 306 is performed by a control circuit. At optional step 307, the method 300 can include, in response to receiving another user input, again modifying the playback by presenting the advertisement and at least some other of the viewership activity data in synchrony. In one embodiment, step 307 is performed by a control circuit.

Figure 4:
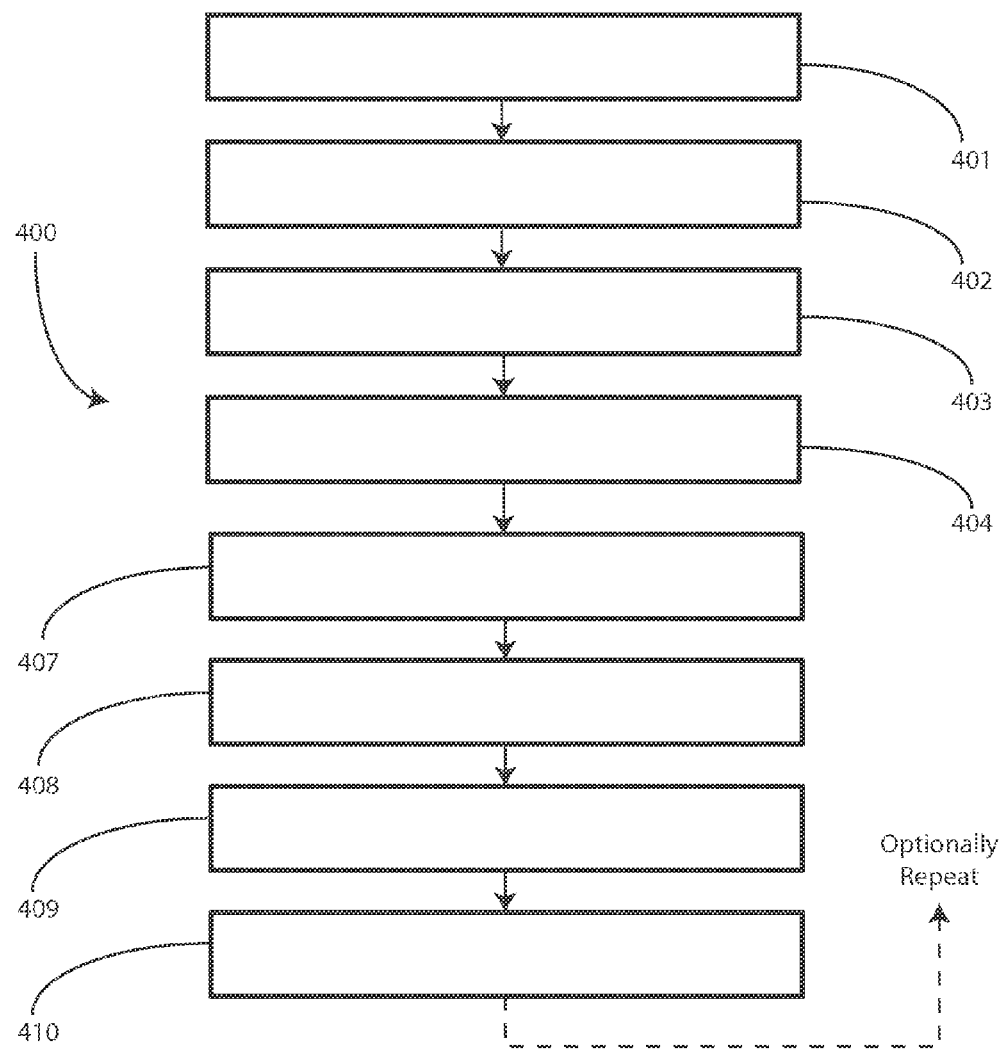
FIG. 4 illustrates an explanatory method in accordance with one or more embodiments.

Turning now to FIG. 4, illustrated therein is a method 400 for presenting data on a display. At step 401, the method 400 retrieves an advertisement. In one embodiment, the advertisement of step 401 is retrieved from a memory device.

At step 402, the method 400 delivers the advertisement to one or more client devices. In one embodiment, step 402 is performed by a delivery device.

At step 403, the method 400 captures viewer behavior data. In one embodiment, the viewer behavior data of step 403 is captured with a data capture device.

At step 404, the method 400 synchronizes the advertisement and the viewer behavior data. In one embodiment, step 404 occurs in the memory device.

At step 405, the method 400 delivers a user interface to a consumption device. In one embodiment, the user interface is to playback the advertisement and at least some of the viewer behavior data in synchrony at step 405. In one embodiment, the user interface is to present a linear representation of the viewer behavior data at step 405.

At optional step 406, the method 400 modifies the user interface to present filter selection controls. The use of filter selection controls allows a user to select which ones of the viewership behavior data to view in synchrony with the advertisement in the user interface. For example, the filter selection controls can allow the user to limit the viewership behavior data to only demographic data. Where the filter selection controls are present, the method 400 can receive a filter at step 407 and can then alter at least some of the viewer behavior data in accordance with the filter.

Figure 5:
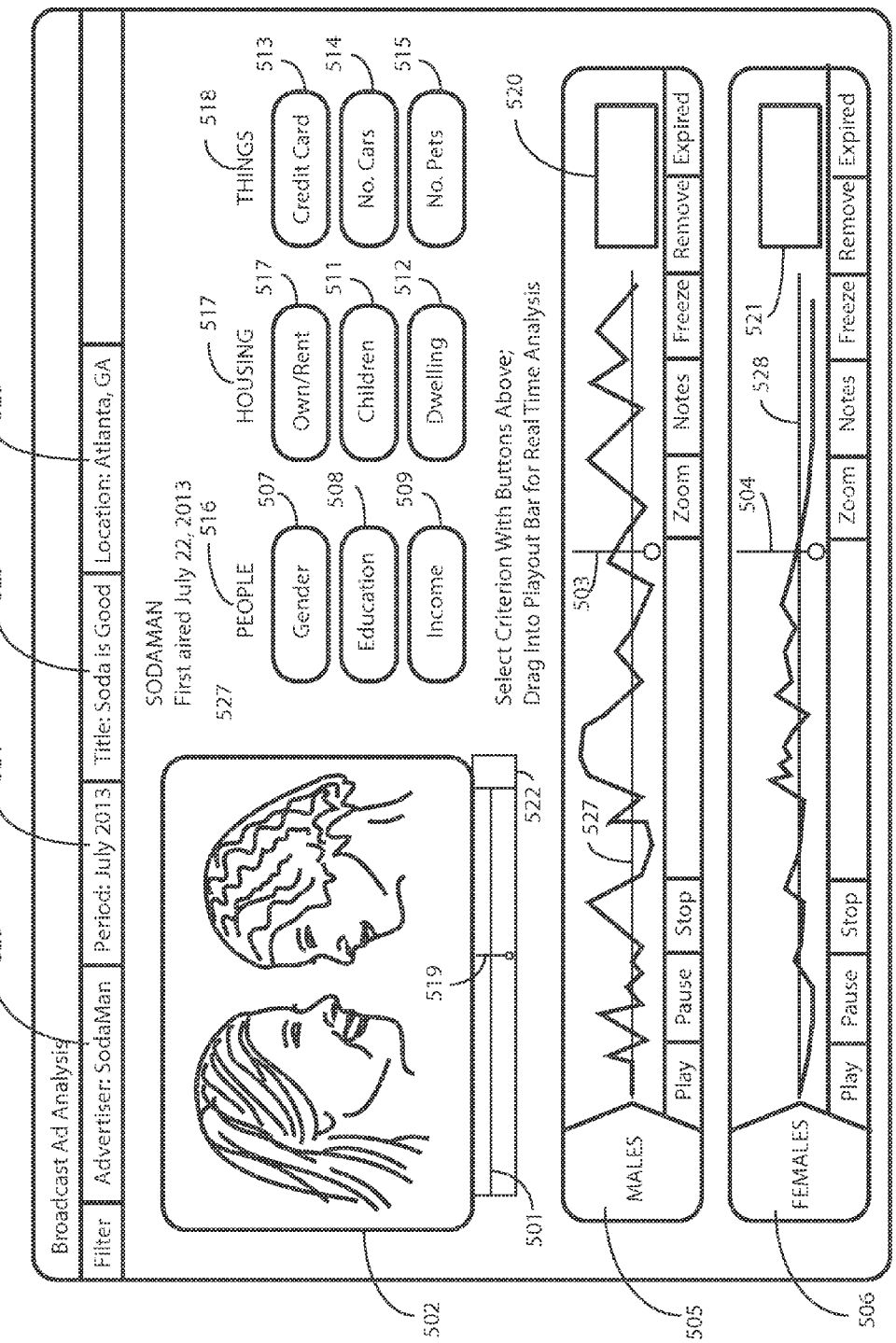
FIG. 5 illustrates an explanatory user interface in accordance with one or more embodiments.

Turning now to FIG. 5, illustrated therein is one user interface 500 configured in accordance with one or more embodiments of the disclosure. The user interface 500 is suitable for presentation on any of a display device, a display, or a consumption device as described above.

In this embodiment, the user interface 500 includes a playback of an advertisement 502. The user interface 500 also includes a playout 527,528 of viewership behavior data 505, 506. This particular viewership behavior data 505,506 comprises satisfaction ratings occurring during the initial playout of the advertisement 502. As shown in this illustrative embodiment, two different viewership behavior data 505,506 are shown. Each is segmented according to demographic data. Viewership behavior data 505 illustrates the satisfaction of males during the initial playout of the advertisement 502, while viewership behavior data 506 illustrates the satisfaction of females during the initial playout of the advertisement 502. In this illustrative embodiment, the viewership behavior data 505,506 is presented as a linear representation continuously drawn across a time span corresponding to a duration of the advertisement 502.

One or more filter selection controls 507,508,509,510,511, 512,513,514,515 are presented on the user interface 500. In one or more embodiments, the user interface 500 is modified to present the filter selection controls 507,508,509,510,511, 512,513,514,515.

By actuating the filter selection controls 507,508,509,510, 511,512,513,514,515, a user can select which types of viewership behavior data they wish to watch with the advertisement 502. In the illustrative embodiment of FIG. 5, the gender filter selection control 507 has been actuated, thereby causing viewership behavior data 505 to illustrate the satisfaction of males during the initial playout of the advertisement 502, while causing viewership behavior data 506 to illustrate the satisfaction of females during the initial playout of the advertisement 502.

In this illustrative embodiment, the filter selection controls 507,508,509,510,511,512,513,514,515 are arranged in three categories 516,517,518. The first category 516 is demographic data, and includes a gender filter selection control 507, an education filter selection control 508, and an income filter election control. The second category 517 is residence data, and includes a filter selection control 510 indicating whether a viewer of the advertisement 502 owns or rents their home, a filter selection control 511 indicating whether a viewer of the advertisement 502 has children, and a filter selection control 512 indicating in what type of dwelling the viewer of the advertisement 502 resides. The third category 518 is an economic data. This category 518 includes a filter selection control 513 indicating whether a viewer of the advertisement 502 has a credit card, a filter selection control 514 indicating the number of cars a viewer of the advertisement 502 owns, and a filter selection control 515 indicating the number of pets a viewer of the advertisement 502 owns. Other filter selection controls will be obvious to those of ordinary skill in the art having the benefit of this disclosure.

When a user of the user interface 500 actuates a filter selection controls 507,508,509,510,511,512,513,514,515, the delivery device, server complex, and/or control circuit delivering the user interface receives a filter. In one embodiment, the delivery device, server complex, and/or control circuit alters at least some of the viewership behavior data in accordance with the filter. For example, In one or more embodiment, where the income filter selection control 509 is actuated, this may cause viewership behavior data 505 to illustrate the satisfaction of a viewer of the advertisement 502 earning more than $50,000 per year, while causing viewership behavior data 506 to illustrate the satisfaction of a viewer of the advertisement 502 earning less than $50,000 a year during the initial playout of the advertisement 502.

In one or more embodiments, the viewership behavior data 505,506 is presented in synchrony with a playback 501 of the advertisement 502. This synchrony is illustrated in FIG. 5 with synchronous indicators 503,504,519, each appearing at the same location across a duration of the advertisement 502. This synchrony is also illustrated in this explanatory embodiment by the inclusion of temporal indicators 520,521,522. These temporal indicators 520,521,522 indicate when during the playout the particular viewership activity data 505,506 occurs.

In this illustrative embodiment, the user interface 500 includes the presentation of additional information as well. The name 523 of the advertiser providing the advertisement 502 is shown. Additionally, the period 524 in which the viewership activity data 505,506 was collected is also provided. The title 525 of the advertisement 502 is provided, as is the location(s) 526 in which the viewership activity data 505,506 was collected. The first aired date 527 is also provided.

Figure 6:
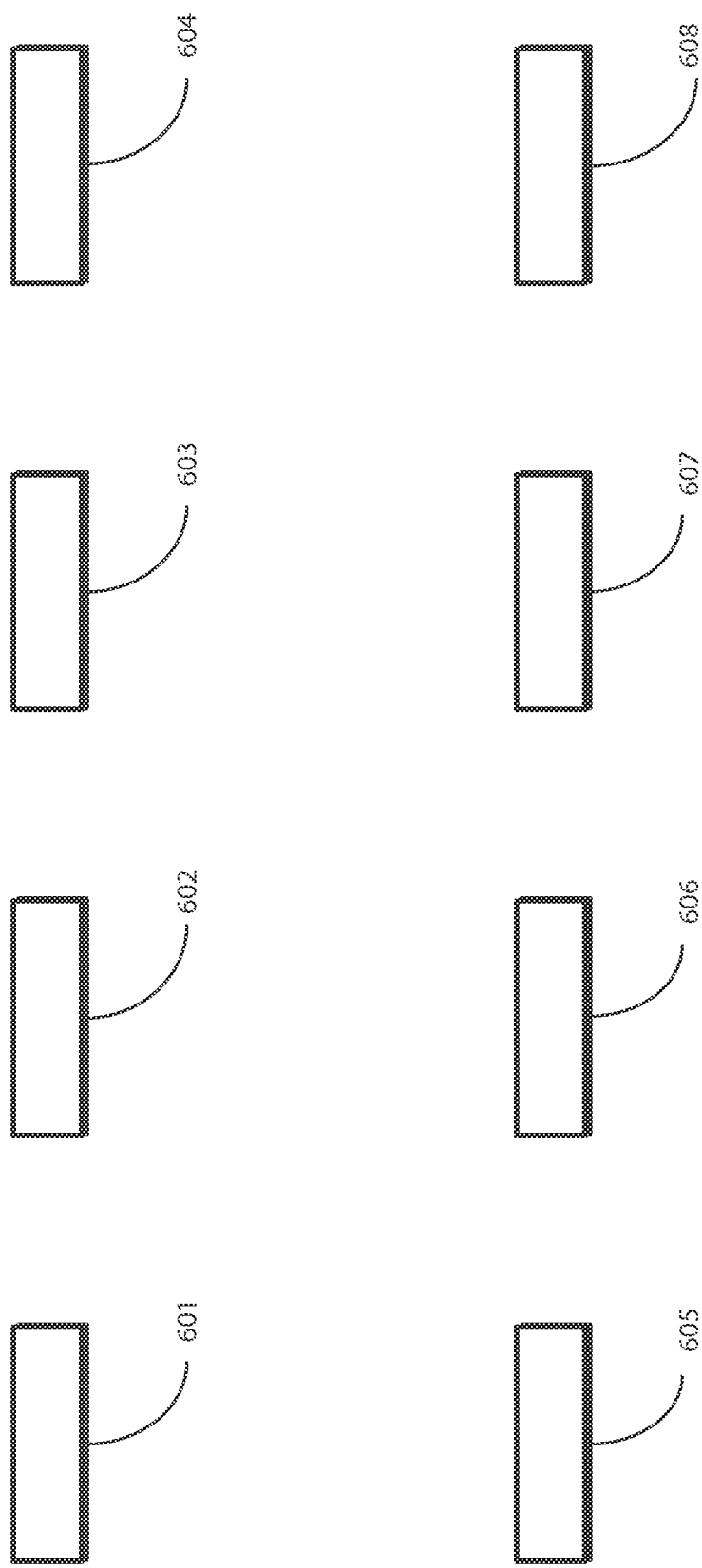
FIG. 6 illustrates various embodiments of the disclosure.

Turning to FIG. 6, illustrated therein are various embodiments of the disclosure. At 601, an apparatus for customizing a user interface on a display device is provided. The apparatus of 601 comprises a server complex in communication with one or more client devices. At 601, the server complex is to cause a channel collector device to capture viewership activity data from one or more client devices occurring during playout of an advertisement and deliver a user interface to a consumption device, the user interface comprising both the advertisement and at least some of the viewership activity data presented in synchrony. At 602, at least some of the client devices of 601 comprise set-top boxes. At 603, at least some of the client devices comprise portable electronic devices. At 604 the user interface of 601 comprises filter selection controls. At 605, the user interface of 601 comprises a linear representation of the at least some of the viewership activity data.

At 606, the user interface of 601 comprises at least some other of the viewership activity data presented in synchrony with both the advertisement and the at least some of the viewership activity data. AT 607, the advertisement of 601 comprises a television commercial. At 608, the user interface of 601 comprises a temporal indicator indicating when during the playout particular viewership activity data occurs. Other embodiments of will be obvious to those of ordinary skill in the art having the benefit of this disclosure.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for customizing a user interface on a display device, the method comprising:
    delivering, with a control circuit, an advertisement to a plurality of client devices;
    capturing, with a channel collector operable with the control circuit, viewership activity data occurring during playout of the advertisement;
    storing the viewership activity data and the advertisement in a memory operable with the control circuit; and
    modifying, with the control circuit, a presentation characteristic of the user interface by presenting, by displaying on the display device, a playback comprising both the advertisement and at least some of the viewership activity data in synchrony.

2. The method of claim 1, the synchrony occurring on a second by second basis.

3. The method of claim 1, further comprising receiving, with the control circuit, a user input identifying the at least some of the viewership activity data.

4. The method of claim 3, further comprising receiving another user input identifying at least some other of the viewership data, and in response to the receiving another user input, modifying the playback by presenting the advertisement and at least some other of the viewership activity data in synchrony.

5. The method of claim 3, the at least some of the viewership activity data comprising demographic data.

6. The method of claim 3, the at least some of the viewership activity data comprising economic data.

7. The method of claim 3, the at least some of the viewership activity data comprising residence data.

8. The method of claim 1, the viewership activity data presented in a linear presentation window.

9. A method for presenting data on a display, comprising:
    retrieving an advertisement from a memory device;
    delivering the advertisement from a delivery device to a plurality of client devices;
    capturing viewer behavior data with a data capture device;
    synchronizing the advertisement and the viewer behavior data in the memory device; and
    delivering a user interface to a consumption device, the user interface to playback, by displaying on the display, the advertisement and at least some of the viewer behavior data in synchrony.

10. The method of claim 9, further comprising receiving a filter at the delivery device and altering the at least some of the viewer behavior data in accordance with the filter.

11. The method of claim 9, the delivering comprising presenting a linear representation of the at least some of the viewer behavior data.

12. The method of claim 9, further comprising modifying the user interface to present filter selection controls.

13. An apparatus for customizing a user interface on a display device, comprising:
    a server complex in communication with one or more client devices, one or the server complex to:
        cause a channel collector device to capture viewership activity data from the one or more client devices occurring during playout of an advertisement; and
        deliver the user interface to a consumption device, for displaying on the display, the user interface comprising both the advertisement and at least some of the viewership activity data presented in synchrony.

14. The apparatus of claim 13, at least some of the one or more client devices comprising set top boxes.

15. The apparatus of claim 13, at least some of the one or more client devices comprising portable electronic devices.

16. The apparatus of claim 13, the user interface comprising filter selection controls.

17. The apparatus of claim 13, the user interface comprising a linear representation of the at least some of the viewership activity data.

18. The apparatus of claim 13, the user interface further comprising at least some other of the viewership activity data presented in synchrony with both the advertisement and the at least some of the viewership activity data.

19. The apparatus of claim 13, the advertisement comprising a television commercial.

20. The apparatus of claim 13, the user interface comprising a temporal indicator indicating when during the playout particular viewership activity data occurs.

* * * * *